DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 6, 1970

870 O.G. 18

T870,006

ELECTROPHOTOGRAPHIC SYSTEMS CONTAINING TRICHLOROACETIC ACID AS A SENSITIZER

Lawrence E. Contois, Webster, N.Y.
(Kodak Park, Rochester, N.Y. 14650)

Filed Sept. 2, 1969, Ser. No. 854,791
Int. Cl. G03g *13/22*
U.S. Cl. 96—1.5
No Drawing. 36 Pages Specification

Trichloroacetic acid is used to chemically sensitize a coating containing a photoconductor. The coating has a higher speed compared to an element which does not contain trichloroacetic acid. Also, the speed of a coating containing a photoconductor, a conventional sensitizer (such as a pyridinium or carbocyanine dye salt) and a binder is improved by the addition of trichloroacetic acid. The addition of other closely related acid or acid derivatives to the coating in place of trichloroacetic acid has little or no effect on the speed of the coating.